United States Patent [19]

Kita et al.

[11] 4,267,903

[45] May 19, 1981

[54] DISK BRAKE APPARATUS FOR MOTOR VEHICLE

[75] Inventors: Yasuo Kita; Yukinori Nishiyama, both of Itami, Japan

[73] Assignee: Sumitomo Electric Industries, Ltd., Osaka, Japan

[21] Appl. No.: 743

[22] Filed: Jan. 3, 1979

[30] Foreign Application Priority Data

Jan. 19, 1978 [JP] Japan .................. 53-4848

[51] Int. Cl.³ .......................................... F16D 55/26
[52] U.S. Cl. ..................... 188/72.6; 60/589;
188/71.8; 188/72.7; 188/196 A; 188/351;
188/370; 192/70.25; 192/111 A; 403/35;
403/37
[58] Field of Search ............... 188/72.1, 72.4, 72.6,
188/72.7, 71.8, 351, 370, 196 A; 192/111 A,
70.25; 60/589; 403/31, 34, 35, 37

[56] References Cited

U.S. PATENT DOCUMENTS

| | | | |
|---|---|---|---|
| 3,103,990 | 9/1963 | Wilkinson | 188/72.6 X |
| 3,243,016 | 3/1966 | Swift | 188/72.7 X |
| 3,262,273 | 7/1966 | Harvey | 60/589 X |
| 3,517,784 | 6/1970 | Clemmons | 188/196 A |
| 3,643,763 | 2/1972 | Hay | 188/71.8 |
| 3,878,921 | 4/1975 | Kibler et al. | 188/72.7 X |
| 3,974,897 | 8/1976 | Pringle | 188/196 A |

FOREIGN PATENT DOCUMENTS

| | | |
|---|---|---|
| 2617073 | 11/1977 | Fed. Rep. of Germany ... 188/196 A |
| 1253527 | 1/1961 | France .................. 188/351 |
| 43-25425 | 11/1968 | Japan . |
| 51-116377 | 10/1976 | Japan . |
| 51-144877 | 12/1976 | Japan . |
| 52-132275 | 11/1977 | Japan . |

Primary Examiner—George E. A. Halvosa
Attorney, Agent, or Firm—Pollock, Vande Sande & Priddy

[57] ABSTRACT

A hydraulically operated disk brake apparatus for a motor vehicle comprises a brake disk, a caliper-like brake housing disposed to straddle over the brake disk and having a pair of arms, and a pair of brake pad assemblies disposed in the brake housing in opposition to each other with the brake disk being interposed therebetween. The brake pad assemblies are movable toward and from the brake disk. A cylinder chamber is formed in one of the caliper arms and accommodates therein a first piston for pressing the adjacent brake pad assembly to the brake disk and a second piston positioned with a distance from the first piston. The second piston is operated by an externally provided actuator member to produce a hydraulic pressure in the cylinder chamber for moving the first piston and the associated brake pad assembly toward the brake disk. A reservoir for hydraulic fluid is formed in the brake housing to supply supplementary fluid into the cylinder chamber.

7 Claims, 2 Drawing Figures

U.S. Patent May 19, 1981 4,267,903
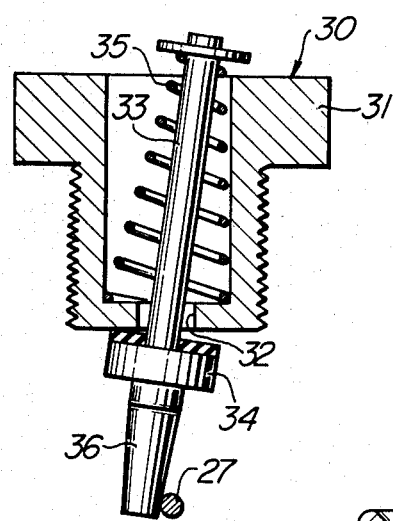
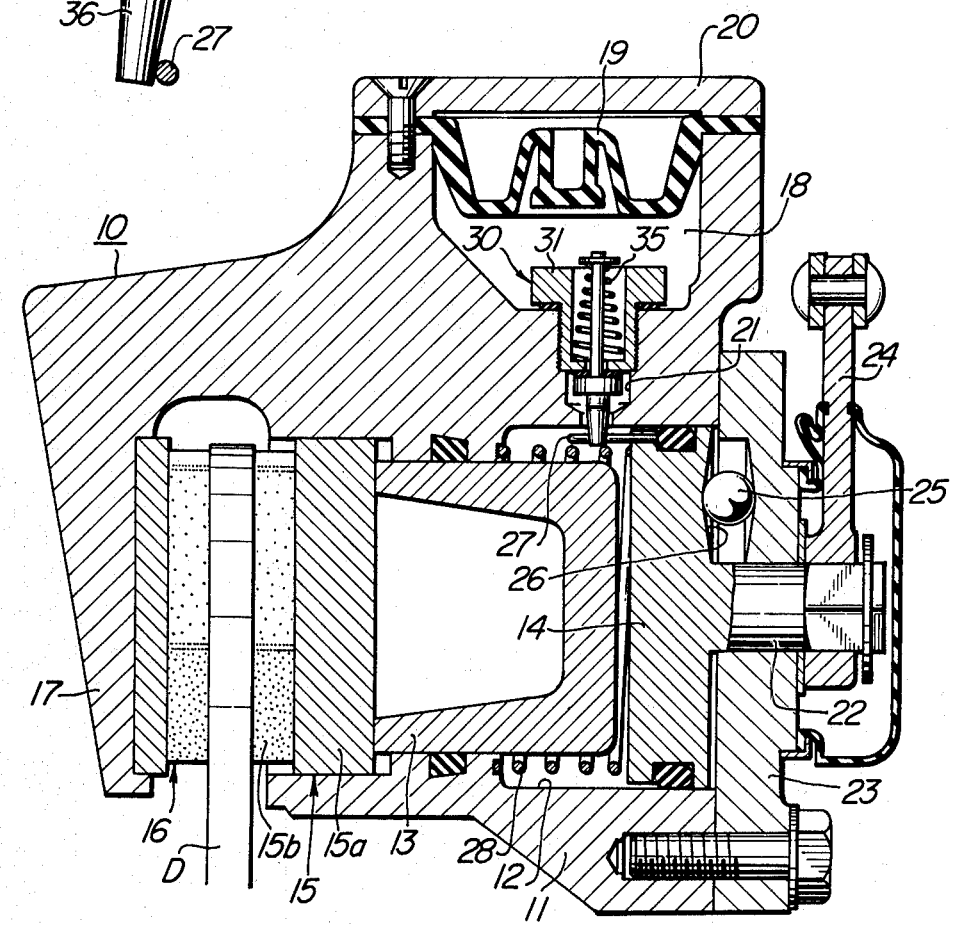

DISK BRAKE APPARATUS FOR MOTOR VEHICLE

BACKGROUND OF THE INVENTION

1. Field of the Invention

The present invention relates in general to a disk brake apparatus for motor vehicles and in particular to a hydraulic disk brake apparatus actuated through a hydraulic pressure generating system.

2. Description of the Prior Art

In a disk brake apparatus for motor vehicles such as two-wheel motor vehicles, a pair of brake pad assemblies are disposed in opposition to each other across an interposed brake disk which is mounted on an axle so as to be rotatable with an associated wheel. The brake pad assemblies are held movably relative to the brake disk by the respective arm portions of a caliper-like brake housing generally referred to as the caliper. One of the caliper arms is formed therein with a hydraulic cylinder chamber in which a piston is slidably diposed, whereby one of the brake pad assemblies is caused to bear against the brake disk when the piston is correspondingly moved under the hydraulic pressure produced in the cylinder, while the other brake pad assembly is subsequently brought into frictional engagement with the brake disk under the force transmitted to the associated caliper arm from the hydraulic cylinder in the manner well known to the art.

The hydraulic cylinder formed in the caliper arm is communicated to a master cylinder which constitutes a hydraulic pressure generating source and is adapted to be operated by a suitable means such as foot pedal. The master cylinder is provided separately from the cylinder formed in the caliper arm and is hydraulically communicated to the latter by way of a pipe line such as rubber hose or conduit of copper so that the hydraulic pressure produced in the master cylinder through operation of the foot pedal or the like may be transmitted to the cylinder chamber formed in the caliper arm so as to move the piston and hence the associated brake pad assembly toward the brake disk.

The hydraulic disk brake system of the arrangement described above is susceptible to various drawbacks. In the first place, because the master cylinder is provided separately from the disk brake apparatus, high expenditure as well as time consuming labour are required for the manufacture and installation of the master cylinder and associated parts or fixtures such as pipe line. Further, there may arise a loss in hydraulic pressure transmitted to the cylinder chamber in the caliper from the master cylinder because of flow resistance of communicating pipe line. Furthermore, a problem of leakage of hydraulic fluid may be involved. In certain application such as for two-wheel motor vehicles, a space available for mounting the master cylinder is restricted.

SUMMARY OF THE INVENTION

An object of the invention is to provide a hydraulic disk brake apparatus for motor vehicles of a novel and improved structure which is immune to the drawbacks and disadvantages of the hitherto known disk brake systems described above.

Another object of the invention is to provide a hydraulic disk brake apparatus which has a self-contained hydraulic pressure generating source so that provision of a separate master cylinder as well as associated components are utterly unnecessary.

Still another object of the invention is to provide a hydraulic disk brake apparatus which can be realized in a miniaturized compact structure and thus can be installed even in a place where available space is restricted.

In view of the above and other objects which will become more apparent as the description proceeds, there is provided according to a general aspect of the invention a hydraulic disk brake apparatus which comprises, a brake disk mounted on an axle rotatable with a wheel, a caliper-like brake housing having a pair of caliper arms and disposed to straddle over and across the brake disk, a pair of brake pad assemblies disposed in the brake housing in opposition to each other with the brake disk interposed therebetween, said brake pad assemblies being movable relative to the brake disk, a cylinder chamber formed in one of the caliper arms and filled with a hydraulic medium, a first piston slidably disposed in the cylinder chamber and adapted to press the adjacent brake pad assembly to the brake disk, a second piston disposed slidably in the cylinder chamber with a space from the first piston, and means for moving the second piston toward the first piston upon application of the brake, thereby to produce a hydraulic pressure within the cylinder chamber under which the first piston and the associated brake pad assembly are caused to move toward the brake disk.

According to another feature of the invention, a reservoir for containing hydraulic medium such as oil is formed in the caliper and communicated to the cylinder chamber to supply supplementary hydraulic medium to the cylinder chamber when the brake apparatus is in the inoperative position. Such supplementary hydraulic medium supply is required since the effective volume of the cylinder chamber is increased due to abrasion of the brake pad.

Above and other objects, features and advantages of the invention will become more apparent from the description of preferred embodiments taken in conjunction with the accompanying drawings.

BRIEF DESCRIPTION OF THE DRAWINGS

FIG. 1 is a vertical sectional view showing a disk brake apparatus according to an embodiments of the invention, and FIG. 2 is an enlarged vertical view of a valve device employed in the disk brake apparatus shown in FIG. 1.

DETAILED DESCRIPTION OF THE PREFERRED EMBODIMENTS

Referring to FIG. 1 which shows a disk brake apparatus according to an embodiment of the present invention, reference numeral 10 denotes generally a brake caliper or housing having a depending arm portion 11 in which a cylinder chamber 12 is formed. A first piston 13 and a second piston 14 are axially slidably accommodated within the cylinder chamber 12 in a fluid tight manner. The first piston 13 is axially spaced from the second piston 14 for an appropriate distance so that a hydraulic space is defined therebetween. It is to be noted that the second piston 14 which is implemented in a form of a disk is adapted to be rotatable about the center axis thereof within a predetermined angular range, as will be hereinafter described in detail.

A backing plate 15a of a brake pad assembly 15 having a frictional brake pad 15b is slidably disposed at a bore formed in the inner portion of the caliper arm 11 in an axial alignment with the first and the second pistons 13 and 14. The outer end face of the first piston 13 bears on the rear surface of the backing plate 15a so that the brake pad assembly 15 can be moved toward a brake disk D when the first piston 13 is actuated upon braking operation. The brake disk D is mounted on an axle of a vehicle (not shown) rotatably with an associated wheel (not shown). In the case of the illustrated embodiment which concerns a floating type of the disk brake apparatus, when the brake pad assembly 15 is brought into frictional contact with the brake disk D, the caliper 10 is moved due to the reacting force exerted by the brake disk D in the direction opposite to the direction in which the brake pad assembly 15 is pressed against the disk D by the first piston 13, whereby the other brake pad assembly 16 mounted on the other caliper arm 17 in a position oppositely aligned with the first brake pad assembly 15 across the brake disk D is caused to be pressed against the brake disk D, which is thus subjected to the braking forces at the both sides thereof in a sandwiched manner.

A reservoir 18 for containing therein a hydraulic medium such as oil is formed in the caliper 10 at a top portion thereof. The top open end of the reservoir 18 is hermetically closed by an elastic or resilient seal member 19 which is fixedly held in place by a cover plate 20 secured to the caliper 10 by suitable means such as set screws.

The reservoir 18 is communicated to the cylinder chamber 12 through a passage 21 in which a valve device 30 is mounted. The structure as well as operation of the valve device 30 will be described hereinafter.

The second piston 14 has a center shaft 22 formed integrally therewith at the side opposite to the first piston 13. The shaft 22 extends outwardly through a cover plate 23 which is secured to the caliper 10 to close the cylinder chamber 12. A lever 24 is fixedly mounted on the projecting end portion of the shaft 22 so that the second piston 14 is rotated about the center axis thereof through the shaft 22 when the lever 24 is rotated. On the other hand, a thrust ball 25 is rollingly held in a concaved portion formed in the inner surface of the cover plate 23 in engagement with a camming surface 26 formed in an intermediate portion of the outer surface of the second disk-like piston 14. The camming surface 26 is slanted or inclined along the rotating direction of the second piston 14 so that the latter is axially moved toward the first piston 13 upon being rotated by the lever 24 by virtue of the thrust ball 25 rollingly engaging the slanted camming surface 26. In this manner, when the lever 24 is rotated, the second piston 14 is axially thrusted toward the first piston 13 while being rotated, as the result of which the first piston 13 is pressed to the backing plate 15a of the brake pad assembly 15 under the hydraulic pressure produced in the hydraulic space, whereby the brake pad assembly 15 is caused to bear against the brake disk D as described hereinbefore.

A coil spring 28 or the like member is provided to urge constantly the second piston 14 toward the closing cover plate 23 and to restore the second disk-like piston 14 to the starting position upon removal of brake action in which the ball 25 will be located at the deepest position in the slanted camming surface 26. Although a single combination of the thrust ball 25 and the slanted camming surface 26 is illustrated, it will be appreciated that two or more such combinations may be employed in a symmetrical array.

The valve device 30 briefly described hereinbefore serves to supply hydraulic medium or oil supplementally to the cylinder chamber 12 to supplement any possible insufficiency in the oil quantity in the cylinder chamber 12. Such insufficiency of oil quantity may rise when the the volume of the hydraulic space between the first and the second pistons 13 and 14 is increased due to abrasion of the brake pads 15a.

Referring to FIG. 2 in combination with FIG. 1, a valve housing or box 31 is provided in the passage 21 communicating the reservoir 18 to the cylinder chamber 12. A port 32 is formed in the bottom wall of the cup-like valve box 31 and a valve stem 33 is disposed through the port 32 loosely, i.e. with some play. A valve element 34 is secured to the valve stem 33 at a position below the bottom of the valve box 31. The valve stem 33 is resiliently biased upwardly as viewed in the drawing by means of a coil spring 35.

A valve actuation member 27 in a form of a pin is secured to the second piston 14 at such a position that the lower free end portion 36 of the valve stem 33 is moved by the actuation pin 27 against the biasing force of the coil spring 35 when the second piston 14 is located at the retracted or inactive position (righthand position as viewed in FIG. 1), whereby the port 32 is opened by the valve element 34 (FIG. 2) to allow the passage of hydraulic medium from the reservoir 18 to the cylinder chamber 12.

Upon application of brake, the lower free end portion 36 of the valve stem 33 is disengaged from the actuator pin 27 because of the rotation of the second piston 14. The valve stem 33 is then put in the vertical position with the valve element 34 positioned to close the port 32 under the influence of the coil spring 35. In this manner, the valve device 30 functions as a check valve to prevent the hydraulic medium from flowing back to the reservoir 18 upon application of the brake.

The disk brake apparatus of the construction described above brings about the following advantages:

(a) By virtue of the arrangement such that both of the first piston for pressing the brake pad assembly and the second piston for producing a hydraulic pressure to thrust the first piston are disposed within a single cylinder chamber, the brake apparatus can be realized in a compact and simplified structure with a minimum number of components or parts without requiring complicated works and procedures for the assemblying.

(b) Provision of a separate master cylinder which has been usually required heretofore is unnecessary. Accordingly, expenditures for manufacturing the master cylinder as well as for the associated parts such as pipe line and so forth can be spared. Further, no problem will be involved to the occupation space for mounting the master cylinder.

(c) Because no pipe line is required, loss of hydraulic pressure in the transmission thereof will never be involved, whereby operation of the brake apparatus can be accomplished with a high efficiency.

(d) By virtue of the supplementary supply of the hydraulic medium to the cylinder chamber, provision of adjuster for compensating the abrasion of the brake pad is not required.

Although the invention has been described on the assumption that the invention is applied to a floating type disk brake apparatus, it will be readily appreciated that the invention can be applied to other types of disk brake apparatus. Further, the invention is never restricted to the disclosed embodiment but many modifications and variations will readily occur to those skilled in the art without departing from the spirit and scope of the invention. For example, in place of combination of ball and camming surface to move the second piston toward the first piston while rotating the former, a guide groove and thread combination may be employed.

We claim:

1. A hydraulically operated disk brake apparatus for motor vehicles comprising a brake disk, a caliper-like brake housing having a pair of caliper arms and disposed to straddle over said brake disk, a pair of brake pad assemblies disposed in said caliper housing in opposition to each other with said brake disk being interposed therebetween, said brake pad assemblies being movable toward and from said brake disk, a cylinder chamber formed in one of said caliper arms and filled with a hydraulic medium, a first piston member disposed slidably in said cylinder chamber adjacent to an associated one of said brake pad assemblies, a second piston member disposed slidably in said cylinder chamber with a space from said first piston member, means for sliding said second piston member toward said first piston member upon application of said brake while simultaneously rotating said second piston member, thereby to produce a hydraulic pressure within said cylinder chamber under which said first piston member and said associated brake pad assembly are caused to more toward said brake disk; a reservoir for containing hydraulic medium; and means actuated by rotation of said second piston member for permitting flow of medium from said reservoir into said cylinder chamber when said second piston member is in its rest state, whereby compensation for wear of said brake pad assemblies is automatically achieved.

2. A disk brake apparatus according to claim 1, wherein said sliding means comprises a rotatable actuator member mounted on a shaft connected to said second piston member and projecting outwardly from said cylinder chamber, and means for exerting a thrust force to said second piston member to be moved toward said first piston member when said actuator member is rotated.

3. A disk brake apparatus according to claim 2, wherein said thrust force exerting means comprises a ball disposed rollingly between said second piston member and a wall positioned adjacent to said second piston member for defining said cylinder chamber, and a camming face formed in an end surface of said second piston member adjacent to said wall and slanted in the direction in which said second piston member is rotated, whereby said second piston member is caused to move toward said first piston member through cooperation between said ball and said camming face when said second piston member is rotated by said actuator member.

4. A disk brake apparatus according to claim 1, 2 or 3, further including resilient biasing means for urging constantly said second piston member toward a retracted position corresponding to the rest state of the disk brake apparatus.

5. A disk brake apparatus according to claim 1, wherein a check valve is disposed in a passage communicating said reservoir to said cylinder chamber for preventing flowing of hydraulic medium from said cylinder chamber into said reservoir when said second piston member is rotated from said rest state and slided toward said first piston member upon application of said brake.

6. A disk brake apparatus according to claim 5, wherein said check valve comprises a valve box disposed in said passage and having a port formed in the bottom wall thereof, a valve stem extending through said port with some play, a valve element secured to said valve stem and positioned adjacent to said port at the side leading to said cylinder chamber, a valve actuating member projecting from said valve element into said cylinder chamber, and resilient biasing means for constantly urging said valve element to a position to close said port, said valve actuating member being operated to open said port when said second piston member is at said rest state.

7. A disk brake apparatus according to claim 6, further including a projecting member mounted on said second piston member at such position that as said second piston member rotates, said projecting member contacts and moves said valve actuating member to open said port only when said second piston member is in said rest state.

* * * * *